Patented May 2, 1950

2,505,844

UNITED STATES PATENT OFFICE 2,505,844

INTERPOLYMERIZATION

Pliny O. Tawney, Passaic, N. J., assignor to United States Rubber Company, New York, N. Y., a corporation of New Jersey No Drawing. Application March 18, 1949, Serial No. 82,299

6 Claims. (Cl. 260—23)

This invention relates to a method of increasing the yield of soluble, convertible polymeric material obtained from the copolymerization of a castor-oil maleate with copolymerizable monoolefinic compounds. More specifically, my invention comprises copolymerizing a castor-oil maleate with at least one copolymerizable monoolefinic compound in the presence of carbon tetrachloride, whereby increased yields of soluble, unsaturated convertible resins are obtained.

Copolymers of castor-oil maleates with monoolefinic compounds, e. g., styrene, are in many respects well adapted to the preparation of coating and laminating compositions which, after application, can be cured to a solvent- and heat-resistant state. In this connection they are particularly suitable for blending with other thermosetting resins, e. g., urea-formaldehyde resins and melamine-formaldehyde resins, to secure more flexible products. However, such resins derived from castor-oil maleates of high acid number, e. g., 50–100, i. e., those containing relatively large amounts of maleic acid ester groups (such as are obtained, for example, from the reaction of 1 mole of castor-oil with 2–3 moles of maleic anhydride in a manner well known to those skilled in the art) tend to form an insoluble gel during the copolymerization reaction and before more than a minor proportion of monomers has been converted to the copolymeric form. Such products are of limited commercial utility since the presence of the masses of insoluble gel effects serious discontinuities in the resulting coating or laminate, such as cracks, lumps and blisters. A soluble resin can be obtained, albeit in low yields, by halting the copolymerization prior to gelation, although the large amounts of unreacted monomeric starting materials remaining must be removed, purified, and recycled for use in subsequent copolymerizations in order to achieve some degree of economic feasibility. The copolymerization of castor-oil maleates of relatively low acid number, e. g., 20–40 (such as can be obtained from the reaction of 0.3–0.6 moles of maleic anhydride with 1 mole of castor-oil), with styrene shows a diminished tendency toward premature gelation, but the resulting resins are softer, less mar-resistant, and often require more stringent curing conditions to achieve a satisfactory degree of solvent- and heat-resistance in the final product than those derived from the castor-oil maleates of higher acid number.

I have now discovered that when a castor-oil maleate is copolymerized with styrene in the presence of an appreciable amount of carbon tetrachloride, marked increases in the yield of soluble copolymers can thereby be attained. I have further discovered that my process is essentially unique in being restricted to carbon tetrachloride since other common solvents, such as acetone and benzene, exert comparatively small or insignificant effects on the yield of soluble copolymer at comparable dilutions and are neither technically nor economically equivalent to carbon tetrachloride for such purposes. I have also found that as the amount of the carbon tetrachloride in the initial reaction mixture is increased, the amounts of the castor-oil maleate and the styrene converted to the soluble copolymeric form are likewise increased.

Although styrene has been cited above as illustrative of the monoolefinic compounds which are suitable for copolymerization with castor-oil maleates in the method of my invention, various substituted styrenes may be employed instead, including the alpha- and para-substituted styrenes, e. g., p-chlorostyrene, p-methyl-styrene, alpha,p-dimethylstyrene, p-flurostyrene, p-trichloromethylstyrene, p-methoxystyrene, and 2,5-dichlorostyrene. The styrenes can be replaced in whole or part by other monoolefinic hydrocarbons, e. g., vinylnaphthalene and aliphatic olefinic hydrocarbons, especially the lower aliphatic olefinic hydrocarbon, i. e., those having 2 to 6 carbon atoms, e. g., ethylene, propylene and isobutylene, although many of the more reactive members of the latter class suffer the economic disadvantage of being gases at room temperature, and hence they will require pressurized equipment for the copolymerization reaction.

Other suitable copolymerizable monoolefinic compounds which may be used in place of styrene, but which tend to yield softer resins, include vinyl mono-esters of non-enic acids, e. g., vinyl acetate, vinyl butyrate, and vinyl benzoate, and mono-vinyl ethers, e. g., vinyl ethyl ether, vinyl propyl ether and vinyl benzyl ether, and the esters of monoolefinic monocarboxylic acids with non-enic alcohols, e. g., methyl acrylate, n-butyl acrylate, tolyl acrylate, methyl methacrylate, methyl chloroacrylate and methyl crotonate. The monoolefinic acids themselves can be employed, although the resulting resins are more sensitive to water and other hydroxylic solvents and to alkali. Besides esters, other hydrolyzable derivatives of such monoolefinic acids can be employed, such as the anhydrides, acid chlorides, nitriles and amides, the latter two yielding resins which are harder but are compatible with fewer solvents.

The castor-oil maleates, as is well known to those skilled in the art, are prepared by the esterification of maleic acid or maleic anhydride with castor-oil. Usually about 1 mole of the castor-oil is employed per mole of maleic anhydride. This invention also contemplates the employment of castor-oil esters obtained by substitution of some or all of the maleic anhydride by the homologues of maleic acid, such as citraconic acid or citraconic anhydride. If desired, various modifying ingredients, such as linseed oil, may be present in the reaction mixture during the preparation of the ester to be employed in this invention.

In the practice of my invention a castor-oil maleate, preferably one having an acid number of from about 30 to 100, is reacted with from 0.5 to 20 moles, particularly 3–12 moles, of a copolymerizable monoolefinic compound, in the presence of from about 10 to 65 moles of carbon tetrachloride (these molar concentrations being based on 1 mole of the castor-oil maleate). The reaction is carried out at temperatures in the range of 25–120° C., preferably from 40–100° C., for a time sufficient to form at least an appreciable quantity of the soluble copolymer. Suitable reaction times will usually be found to be from about 0.5 to 50 hours, particularly in the range 1–20 hours. Conventional sources of free radicals promote my copolymerization reactions and of these, the organic peroxides, e. g., benzoyl peroxide and tertiary-butyl hydroperoxide, in amounts of from 0.1 to 10% by weight of the total copolymerizable, unsaturated reactants are especially recommended.

The course of my copolymerization reaction can be followed by observing the increase in the viscosity of the reaction mixture, and the copolymer is isolated therefrom, if desired, by evaporation of the carbon tetrachloride or by precipitation of the polymeric material through addition of a non-solvent such as methanol.

The resulting resins can be dissolved in appropriate solvents, e. g., acetone, xylene or mixtures thereof, and employed as coating, impregnating or laminating compositions, either alone or in conjunction with other polymeric materials such as urea-formaldehyde resins. Upon application of heat, these compositions are converted to a solvent- and heat-resistant state.

The following examples disclose my invention in more detail. All parts are by weight.

EXAMPLE 1

The copolymerizations of castor-oil maleate with styrene are carried out in the presence of carbon tetrachloride with benzoyl peroxide as catalyst. The reactions are halted at the point of incipient gelation in each case, and the reaction mixtures are poured into methanol. The precipitated copolymers are washed thoroughly with methanol and dried in vacuo to constant weight.

In Table I the experimental details are summarized. To emphasize the advantages of my process, examples of copolymerization according to prior art methods in the absence of carbon tetrachloride are also included (I-1-3).

Table I

| | Castor-Oil Parts | Maleate Acid No. | Styrene | CCl₄ | Benzoyl Peroxide | Reaction Time, Hrs. | Temp., °C. | Soluble Copolymer |
|---|---|---|---|---|---|---|---|---|
| 1 | 100 | 71 | 115.7 | ------ | 1.07 | 0.8 | 80 | 8.5 |
| 2 | 100 | 71 | 115.7 | 570 | 3.98 | 1.9 | 80 | 68.5 |
| 3 | 100 | 54 | 121.0 | ------ | 1.0 | 4.7 | 60 | 15.2 |
| 4 | 100 | 54 | 121.0 | 359 | 2.91 | 11.0 | 60 | 60.7 |

From the above table it is readily apparent that by carrying out the copolymerization according to my method, very large increases in the yield of soluble convertible copolymer can be readily attained.

EXAMPLE 2

A mixture of 108 parts of castor-oil maleate (acid number 71), 31 parts of styrene, 308 parts of carbon tetrachloride and 2.23 parts of benzoyl peroxide is heated at 81° C. for about 1.5 hours to yield 44.8 parts of a soluble copolymer which can be converted to a solvent- and heat-resistant state by heating at elevated temperatures, e. g., 120–200° C.

Three and seven-tenths parts of a 47.3% solution of the above soluble copolymer in xylene are mixed with 1.41 parts of a 53% solution of urea-formaldehyde resin in xylene. The mixture is spread on a glass plate and baked at 150° C. for 30 minutes to yield a flexible, solvent-resistant film.

Having thus described my invention, what I claim and desire to protect by Letters Patent is:

1. A method of copolymerizing a castor-oil maleate ester with a copolymerizable monoolefinic compound to form a soluble, convertible copolymer, which comprises carrying out the said copolymerization in the presence of from 10 to 65 moles of carbon tetrachloride per mole of castor-oil maleate, and an organic peroxidic polymerization catalyst.

2. A method of copolymerizing an ester of castor-oil and an unsaturated dibasic organic acid selected from the group consisting of maleic acid and its homologues with a copolymerizable monoolefinic compound to form a soluble, convertible copolymer, which comprises carrying out the said copolymerization in the presence of from 10 to 65 moles of carbon tetrachloride per mole of castor-oil ester, and an organic peroxidic polymerization catalyst.

3. A method which comprises heating a mixture of 1 mole of a castor-oil maleate having an acid number of from 30 to 100, 0.5 to 20 moles of a copolymerizable monoolefinic compound, and 10 to 65 moles of carbon tetrachloride at a temperature of 25° to 120° C. in the presence of an organic peroxidic polymerization catalyst in amount of from 0.1 to 10% by weight of the said copolymerizable reactants, whereby a soluble, convertible copolymer is obtained.

4. A method which comprises heating a mixture of 1 mole of a castor-oil maleate having an acid number of from 30 to 100, 3 to 12 moles of a copolymerizable monoolefinic compound, and 10 to 65 moles of carbon tetrachloride, at a temperature of 40° to 100° C. in the presence of an organic peroxidic polymerization catalyst in amount of from 0.1 to 10% by weight of the said copolymerizable reactants, whereby a soluble, convertible copolymer is obtained.

5. A method as in claim 4 in which the copolymerizable monoolefinic compound is styrene.

6. A method as in claim 4 in which the copolymerizable monoolefinic compound is a lower aliphatic monoolefinic hydrocarbon having from 2 to 6 carbon atoms.

PLINY O. TAWNEY.

REFERENCES CITED

The following references are of record in the file of this patent:

UNITED STATES PATENTS

| Number | Name | Date |
| --- | --- | --- |
| 2,378,196 | D'Alelio | June 12, 1945 |
| 2,439,953 | Swiss et al. | Apr. 20, 1948 |